UNITED STATES PATENT OFFICE.

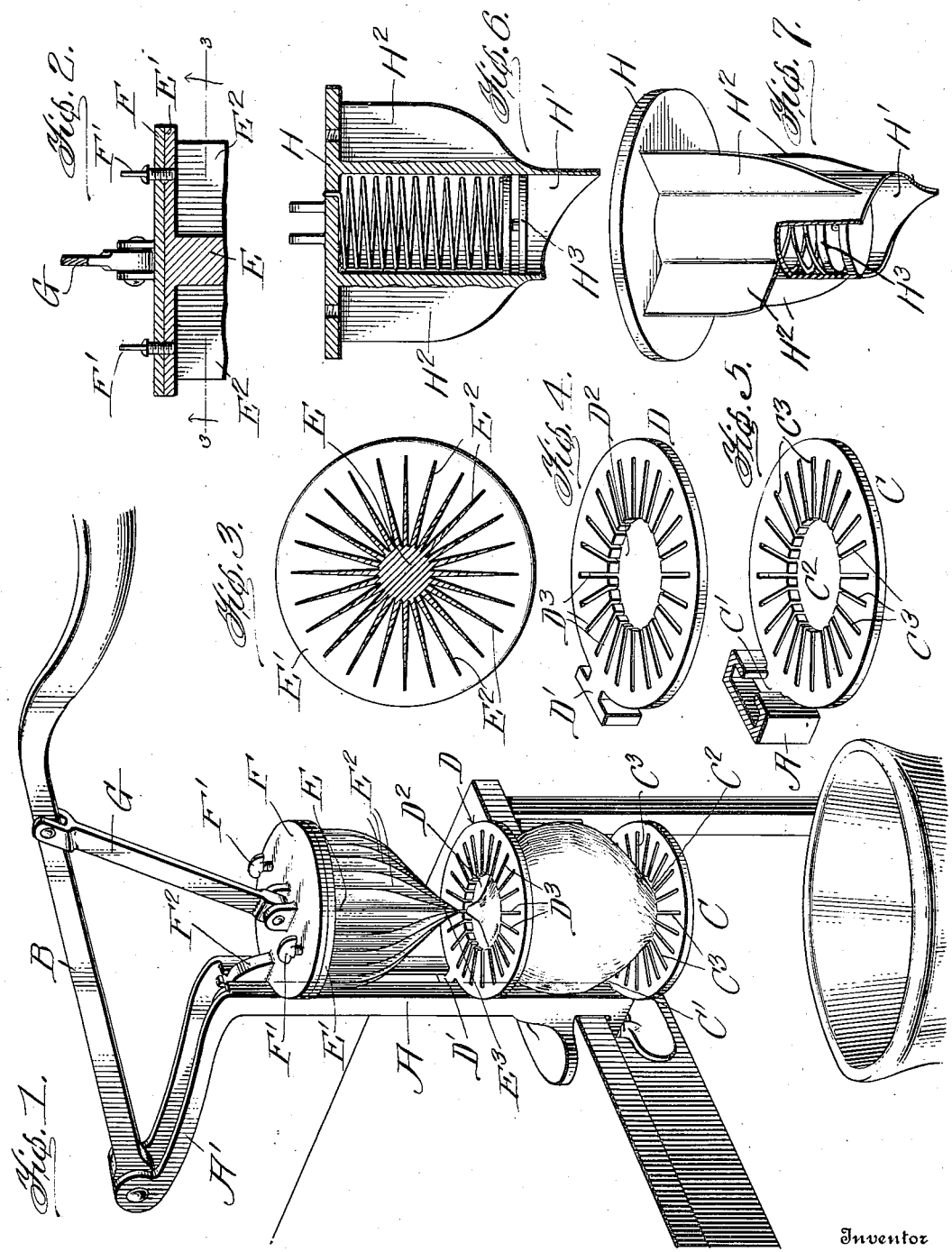

FREDRICK HAMPEL, OF NEW YORK, N. Y.

FRUIT-CUTTER.

951,241.  Specification of Letters Patent.  Patented Mar. 8, 1910.

Application filed June 15, 1908. Serial No. 438,605.

*To all whom it may concern:*

Be it known that I, FREDRICK HAMPEL, a subject of the Emperor of Austria-Hungary, residing at New York, in the State of New York, have invented a new and useful Improvement in Fruit-Cutters, of which the following is a specification.

This invention relates generally to fruit cutters and more particularly to a device which can be used either as a fruit cutter or corer and cutter.

The object of the invention is to provide a cheap and simple device by means of which the fruit can be quickly and easily cut into a number of parts without crushing or mashing the fruit during said cutting operation, and with these objects in view my invention consists essentially in the employment of a standard to which is connected a suitable support, a guide arranged upon the standard also and a cutting blade adapted to move upon the standard and through the guide whereby the fruit will be held firmly during the entire cutting operation.

The invention consists also in certain details of construction and novelties of combination all of which are fully described hereinafter, and pointed out in the claim.

In the drawings forming a part of this specification—Figure 1 is a perspective view of a cutter shown in accordance with my invention. Fig. 2 is a detail sectional view taken through the upper portion of the knife. Fig. 3 is a sectional view taken on the line 3—3 of Fig. 2. Fig. 4 is a detail perspective view of the guide. Fig. 5 is a detail perspective view of the support. Fig. 6 is a sectional view of the combined cutter and corer. Fig. 7 is a perspective view of said device, a part being broken away to disclose the details of construction.

In carrying out my invention I employ a grooved standard A provided with a suitable clamping device at its lower end by means of which it can be fastened to a table, stand or other object. This standard A is formed at its upper end with a horizontally projecting arm A' to which is pivoted an operating handle B which is worked up and down for the purpose of cutting fruit. The fruit is held upon a circular support C having a T-shaped lug C' which is fastened at the lower end of the standard and this support C has a central opening $C^2$ and a series of radial slots $C^3$ which communicate with the central opening. As before stated the fruit to be cut is placed upon this standard and then a guide ring D provided with a T-shaped lug D' which slides in the grooved standard is lowered upon the fruit and serves to hold the same in an upright position upon the support. This guide ring D has a central opening $D^2$ and a plurality of radial slots $D^3$ which lead from said central opening. The knife or cutter E consists of a top plate E' and a plurality of blades $E^2$ which taper toward their lower end and terminate in a common point $E^3$. There are as many blades $E^2$ as there are radial slots $D^3$ and it will be noted that these blades are arranged radially and when they are forced down upon the fruit the pointed end $E^3$ will enter the fruit passing through the central opening in the guide ring and the blades will enter the radial slots $D^3$ and this guide ring therefore not only serves to hold the fruit in place upon the support but it also serves as a guide for the blades of the cutter. The top plate E' is connected to a plate F by means of binding screws F' and this plate F is connected to a handle B by means of a link G so that by working the handle up and down the cutter will be moved up and down also, a T-shaped lug $F^2$ being formed integral with the plate F and working in the grooved standard A.

It will of course be understood that any desired number of blades can be employed and in practice I prefer to provide a number of different cutters so that the fruit may be cut into a large number or few parts as desired. It will be understood that there will also be a guide ring and support for each cutter, the radial slots of the support and guiding ring corresponding with the number of radial blades of the cutter. It will thus be seen that by means of a cutter constructed as hereafter shown and described, I can quickly and easily divide the fruit into an equal number of parts and all danger of crushing or mashing the fruit is entirely avoided.

In Figs. 6 and 7 I have shown a combined cutter and corer, the top plate H being provided with a tubular core H' and the radial cutting blades $H^2$ and within the corer H' is a spring actuated plunger $H^3$ which will eject the corer after the cutter is raised at the completion of the cutting and coring operation. The cutter shown in Fig. 1 can be quickly and easily detached from the plate F and the combined cutter and corer connected therewith and each device will be equipped with a combined cutter and corer.

Having thus fully described my invention, what I claim as new and desire to secure by Letters Patent is:—

A cutting device comprising a standard provided with a horizontal arm at its upper end, a guide ring slidably mounted on said standard, a support connected to said standard, said support having a central opening and a plurality of radiating slots, a guide ring movable upon the standard having a central opening and a plurality of radiating slots, a cutter movable upon the standard and provided with a series of radial cutting blades, a lever pivoted to the horizontal arm and a link connecting the lever and cutter, all arranged to adapt and operate, substantially as described.

FREDRICK HAMPEL.

Witnesses:
CHAS. E. BROCK,
A. E. SUNDERHAUF.